(12) United States Patent
Baptista et al.

(10) Patent No.: US 6,513,548 B2
(45) Date of Patent: Feb. 4, 2003

(54) CONTROL VALVES OF A HYDROSTATIC STEERING SYSTEM

(76) Inventors: Fernando Augusto Baptista, Rua Pádua Correia, 30, 4400-238 Vila Nova de Gaia (PT); Joao Manuel Pereira Dias Baptista, Rua Porfírio Gomes Moreira, 28, 4740 Esposende (PT)

( * ) Notice: Subject to any disclaimer, the term of this patent is extended or adjusted under 35 U.S.C. 154(b) by 0 days.

(21) Appl. No.: 09/878,310

(22) Filed: Jun. 12, 2001

(65) Prior Publication Data

US 2002/0144736 A1 Oct. 10, 2002

(30) Foreign Application Priority Data

Apr. 6, 2001 (EP) .............................. 01108748

(51) Int. Cl.⁷ ................................ F15B 13/02
(52) U.S. Cl. ...................... 137/596; 91/438; 180/421
(58) Field of Search .................. 91/438; 137/596; 180/421

(56) References Cited

U.S. PATENT DOCUMENTS 3,022,772 A  2/1962  Zeigler et al.
4,417,640 A  * 11/1983  Abe et al. ................... 91/438

5,755,300 A  5/1998  Lee et al.

FOREIGN PATENT DOCUMENTS

EP  0 316 235     5/1989
GB  2 086 323 A  5/1982
GB  2 231 541 A  11/1990

OTHER PUBLICATIONS

Abstract of Japanese Publication 58–139868, Published Aug. 19, 1983.

* cited by examiner

*Primary Examiner*—Gerald A. Michalsky
(74) *Attorney, Agent, or Firm*—Hoffman Wasson & Gitler PC

(57) ABSTRACT

Valves are associated and integrated inside a body C. A steering valve includes two cylinders A and B, concentric with the steering shaft D. The cylinder A rolls conjointly with the shaft. The valve controls the direction of the fluid circulation in the cylinders which effect the steering. The safety valve includes two pistons P1, P2 and a spring S, and makes the control easier of the steering, in an occasional lack of fluid pressure (pump damage, fluid leak, cut of the shaft strap, engine stop). A progression valve includes a cylinder and the piston PV. It operates by means of the vacuum effect TV, produced in the engine air admission of the vehicle, controlling the return of the piston P1 in a progressive way, from a certain speed of the said vehicle.

9 Claims, 3 Drawing Sheets

CONTROL VALVES OF A HYDROSTATIC STEERING SYSTEM

BACKGROUND OF THE INVENTION

1. Field of the Invention

The invention refers to the association of new types of control valves for fluid circulation, applied to hydrostatic steering systems.

2. Background of the Invention

In the prior art valves include fluid circuits situated in the steering shaft, resulting in a smaller capacity of circulation of the fluid. The circuit connections do not have well-defined limits, resulting in a lesser definition of the control of the fluid circulation direction. Other difficulties are the small orifices and the strangulation which reduce the capacity of the fluid circulation between the cylinders which effect the steering direction.

In an occasional lack of fluid pressure (pump damage, fluid leak, cut of the shaft strap, engine stop) the reciprocal circulation of the fluid between the cylinders is very difficult and the fluid pressure reaches a high value, making the manual correction of the steering direction difficult. A great insecurity in the hydrostatic steering systems may derive from that situation.

The objective of the present invention is to solve the previously mentioned difficulties by obtaining a greater capacity of the fluid circulation and a higher definition of the limits of the circuits connections in the steering valves to obtain a greater facility of the manual control of the steering by means of a safety valve; and to obtain the progressive hydrostatic control of the steering by means of a progression valve.

INVENTION SUMMARY

The valves are associated and integrated inside a body C and include a first steering valve, controlling the direction of the fluid circulation in the cylinders effecting the steering; a second safety valve, controlling the direct and reciprocal circulation of the fluid between the cylinders, and a third progression valve, controlling the effects progression of the second valve.

The steering valve includes two cylinders A and B, concentric with the steering shaft D. The cylinder A rolls conjointly with the steering shaft. Channels 1, 2, 3, 4 and 5 are inserted in the contiguous peripheries of the cylinders, constituting circuits sets, each set with independent fluid circulation and whose fluid debits are gathered in collectors.

A safety valve is integrated in axial position with the steering valve and includes pistons P1 and P2 and the springs. It is connected to the steering cylinders by connections T3 and T4 with high capacity of fluid circulation. When there is a lack of the fluid pressure the spring S performs the return of the pistons, allowing the free fluid circulation between the steering cylinders and makes control of the steering easier.

The progression valve includes a cylinder and a piston PV, connected to the cylinder and the piston P2. The pistons are connected by a central shaft operating by means of the vacuum produced in the engine air admission of the vehicle, controlling the return of the piston P1 in a progressive way, from a certain speed of the vehicle.

DESCRIPTION OF THE PREFERRED EMBODIMENT

Figure 1:
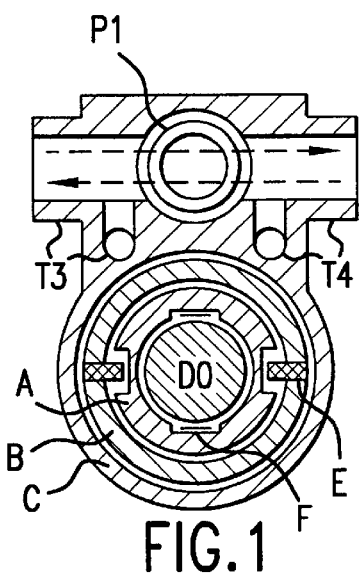
FIG. 1, shows the steering valve in a radial section, being the shaft D0 and the cylinder A in the neutral position; it also shows the piston P1 of the safety valve in the return position allowing the free fluid circulation between the cylinders of the steering system by terminals T3 and T4.
Figure 2:
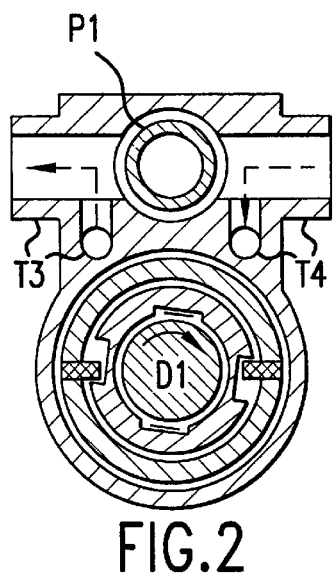
FIG. 2, shows the cylinder A and the shaft rotating in the way D1; the fluid impulsion is transmitted to one of the cylinders of the steering system by terminal T3; the fluid return of the opposite cylinder is received by terminal T4.
Figure 3:
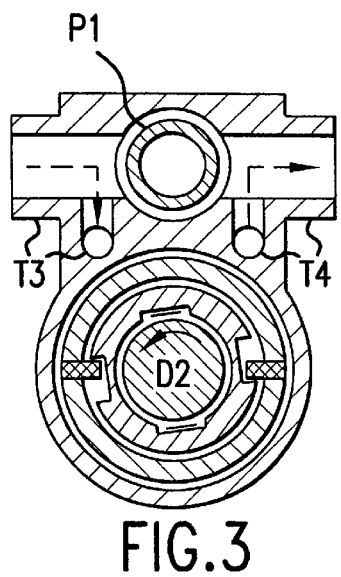
FIG. 3, shows the cylinder A and the shaft rotating in the inverse way D2; the fluid impulsion is transmitted by terminal 4 and the return is received by terminal T3.

The steering, safety and progression valves are associated and integrated inside a body C. The body has terminals T1 and T2 of normal capacity of fluid circulation for connection with the pump. Terminals T3 and T4 of higher capacity of fluid circulation connect with the cylinders effecting the steering direction as seen in FIGS. 1, 2 and 3.

The steering valve is constituted by a first cylinder A and by a second cylinder B concentric with the steering shaft, positions D0, D1 and D2.

The first cylinder rolls conjointly with the shaft by means of the attrition produced by the pressure of the laminar springs F introduced in slots, inserted in a symmetrical position, in the internal periphery of the first cylinder A.

The rotation of the first cylinder A, in relation to the second cylinder B, is limited by bolts E symmetrically fixed in the second cylinder and prolonged for slots inserted in the first said cylinder. The slots have a radial section, permitting the rotation of the cylinder A, in one direction or in inverse direction, so that the exact overlapping of the contiguous extremities of connection of the channels may be obtained.

Channels 1, 2, 3, 4 and 5 in axial position are formed in the contiguous peripheries of the cylinders. The channels have a small width. Connected sets of channels are formed in which the connection extremities of each channels are extensive and contiguous, permitting their exact overlapping and being obtained the maximum exactness of the limits of the corresponding channels connections. Each channels set corresponds with a set of fluid circuits and their connections. The exact overlapping and the greater extension of the circuits connections permit an increase in the fluid circulation and the decrease in the corresponding pressure. The maximum exactness of the limits of the channels connections permits the safe control of the direction of the fluid circulation.

Four channels sets are preferably inserted in a radial and symmetrical position. Each set has openings corresponding to the external connection terminals T1, T2, T3 and T4. The homologous openings are connected to circular collectors inserted in the external periphery of the second cylinder B. The position of each collector corresponds to the terminals, of entrance or of exit of the fluid in the circuits, as seen in FIGS. 7, 8, 9, 19 and 20.

Channel 1 is inserted in axial position in the internal periphery of the second cylinder in connection with terminal T1. Channel 2 is inserted in the external periphery of the first cylinder in the line of the channel 1 and in connection with terminal T2. Channels 5, and the transversal channel of their interconnection, are inserted in the internal periphery of the second cylinder and in connection with terminal T2. Channel 3 and its extension are inserted in axial position in the external periphery of the first cylinder in connection with terminal 4, as seen in FIGS. 10 to 18.

Figure 19:
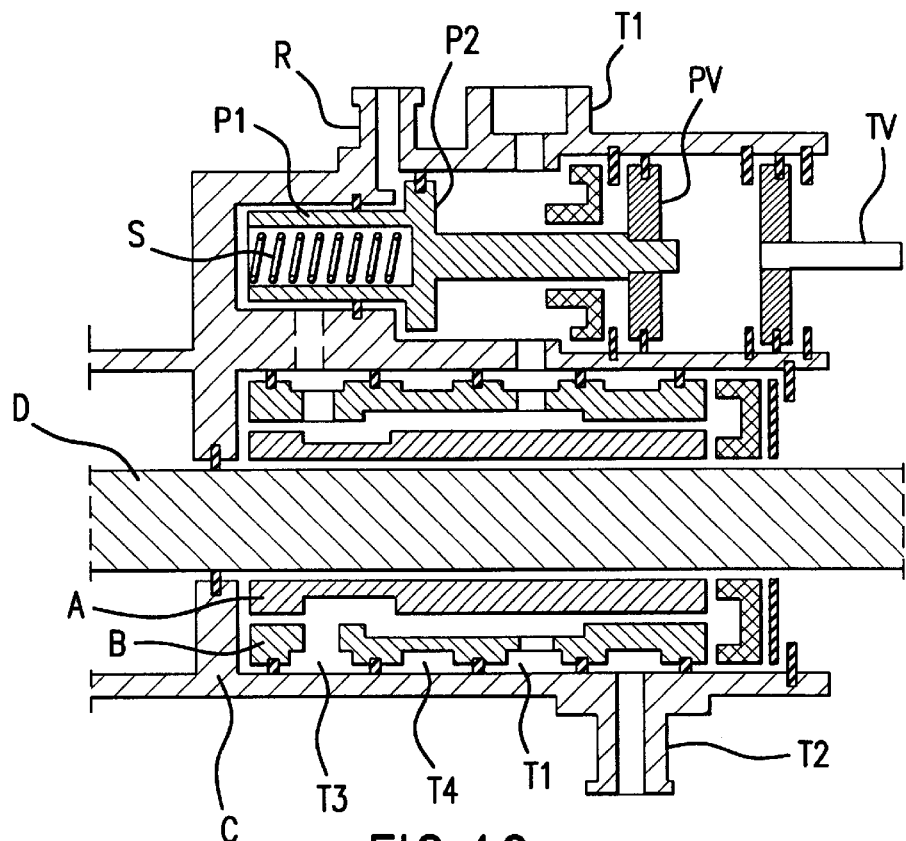
FIG. 19 shows in axial section the advanced position of the pistons P1 and P2 of the safety valve by means of the fluid pressure; it also shows the position of the cylinder and of the piston PV of the progressions valve.
Figure 20:
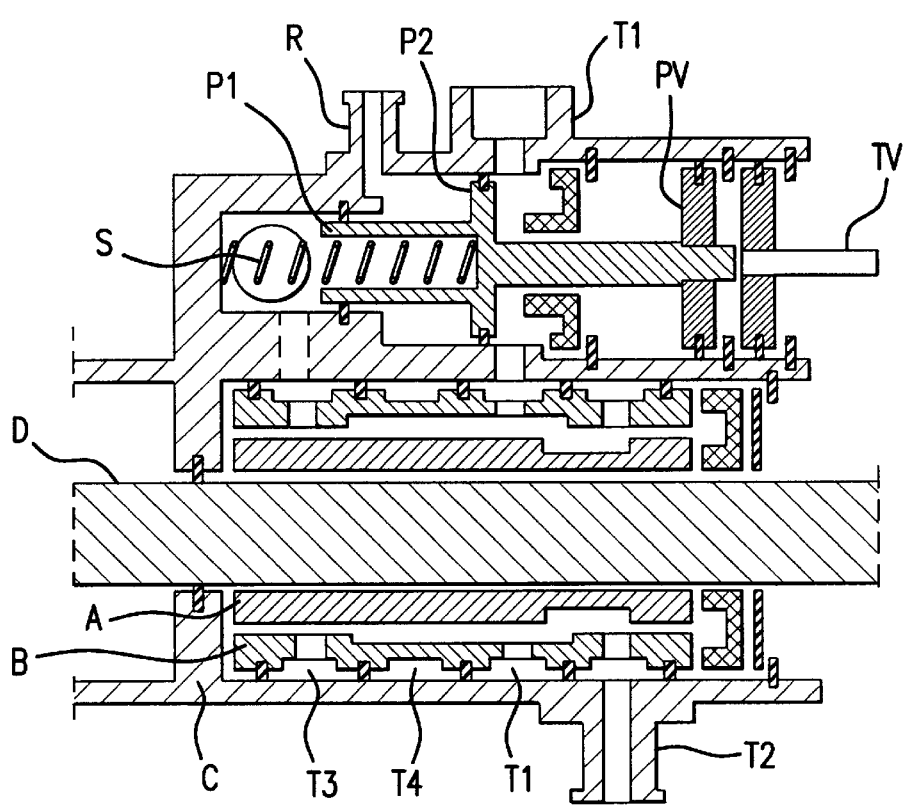
FIG. 20 shows in axial section the back position of the pistons P1 and P2 of the safety valve by means of the spring S and of the piston PV.

The valve receives the fluid impulsion of the pump through terminal T1. The fluid return to the pump is performed through terminal T2, as seen in FIGS. 19 and 20. Terminals T3 and T4 communicate with their respective cylinders which effect the steering direction by means of connections of higher section, as seen in FIGS. 1, 2 and 3.

The description of the functioning of the steering valve relates only to one set of circuits since the functioning of the other sets is identical.

Figure 4:
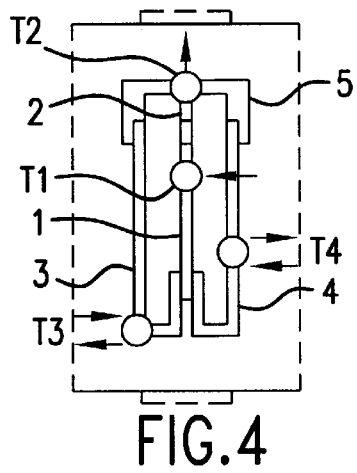
FIGS. 4, 5 and 6, are schemes showing the channels position of a set of the fluid circuits and corresponding connections of the steering valve; when the shaft is in the neutral position D0 the fluid impulsion is directed from terminal T1 to terminal T2, connected to the return circuit of the fluid; in the position D1 the fluid impulsion is directed from terminal T1 to terminal T3 and the fluid return from terminal T4 to terminal T2; in the position D2 the fluid impulsion is directed from terminal T1 to terminal T4 and the fluid return from terminal T3 to terminal T2.
Figure 7:
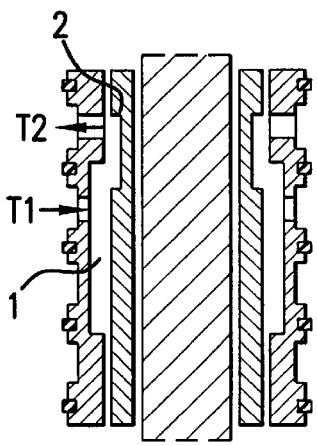
FIGS. 7, 8, and 9, correspond to the schemes of the FIGS. 4, 5 and 6, and respectively show in axial section the overlapping of the channel extremities 1 over the channels extremities 2, 3 and 4, being performed the terminal connections T1 with the terminals T2, T3 and T4.

When the shaft is motionless, referred to as position D0,—the channels of the steering valve are kept in intermediate position. The upper extremity of the channel 1 is adjusted by overlapping to the contiguous extremity of channel 2 and the fluid impelled by the pump freely circulates from the entrance terminal T1 to the exit terminal T2 and returning to the pump, as shown in FIGS. 1, 4 and 7.

Figure 5:
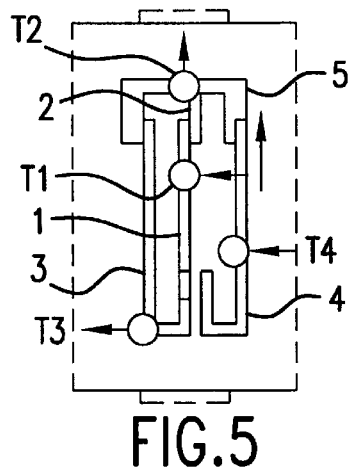
Figure 8:
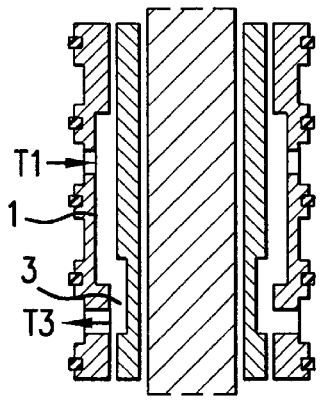

When the steering shaft runs in the direction of the position D1,—the lower extremity of the channel 1 is adjusted by overlapping the channel extension 3 and the impulsion of the fluid accepted by terminal T1, is transmitted by the exit terminal T3 to the respective steering cylinder. At the same time, the fluid of the opposite cylinder returns to the pump through the terminal T4 connection to the terminal T2, as seen in FIGS. 2, 5 and 8.

Figure 6:
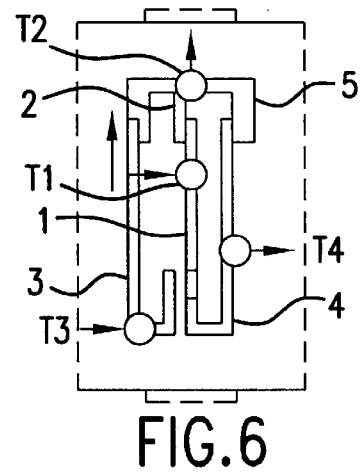
Figure 9:
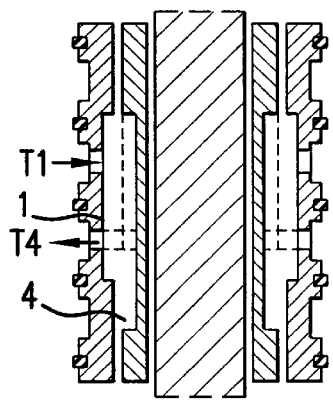
Figure 10:
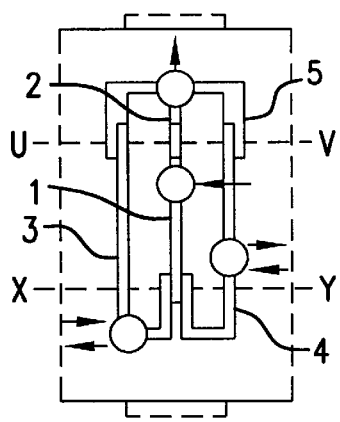
FIGS. 10, 11 and 12, reproduce the schemes of the FIGS. 4, 5 and 6; line (U-V) indicates the position of the radial position of the radial sections represented by FIGS. 13, 14 and 15; line (X-Y) indicates the position of the radial sections represented by FIGS. 16, 17 and 18.
Figure 11:
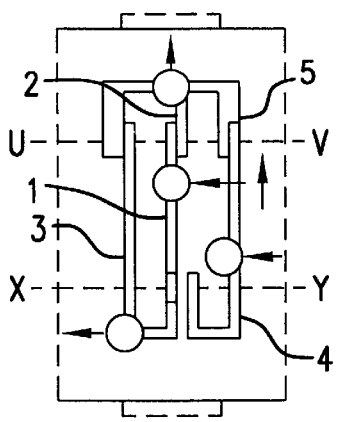
Figure 12:
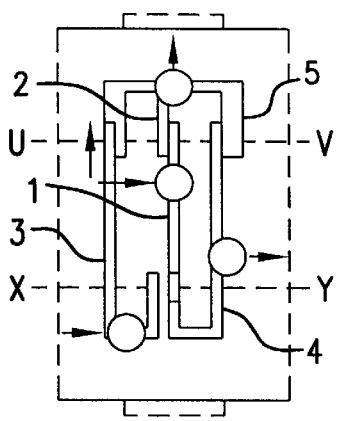
Figure 13:
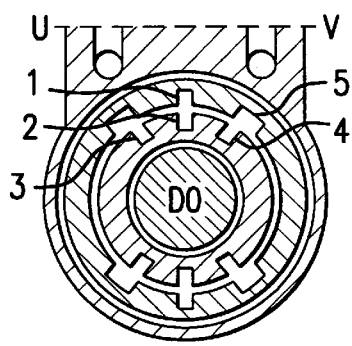
FIGS. 13, 14 and 15, show in axial section, according to the line (U-V) and the shaft positions D0, D1 and D2, the relative position of the channels inserted in the contiguous peripheries of the cylinders A and B.
Figure 14:
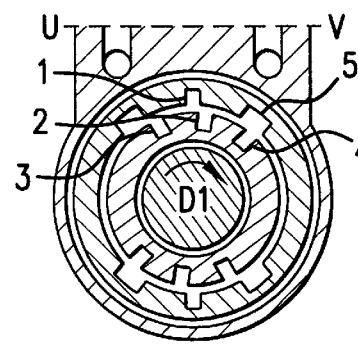
Figure 15:
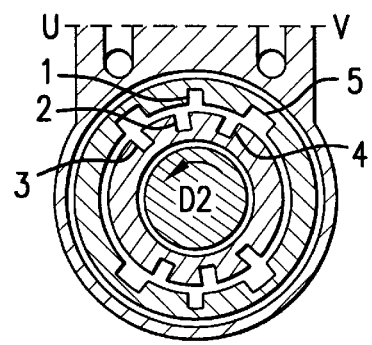
Figure 16:
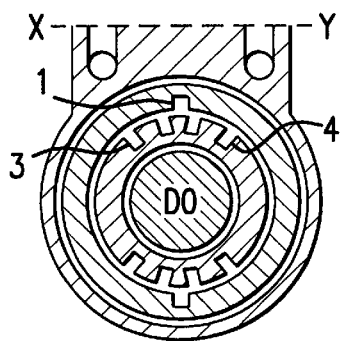
FIGS. 16, 17 and 18, identically show, according to the line (X-Y) and the said shaft positions, the relative position of the respective channels.
Figure 17:
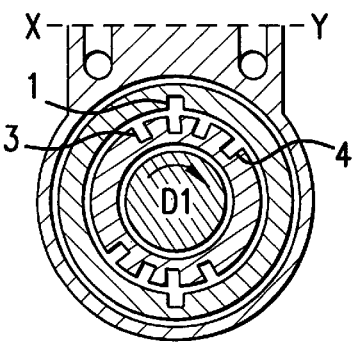
Figure 18:
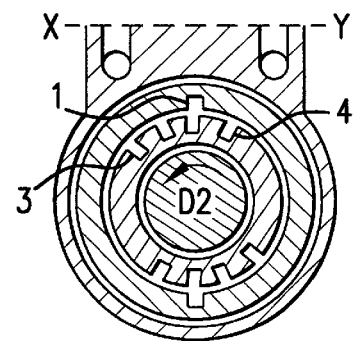

The steering shaft runs in the inverse direction, position D2:—identically, the lower extremity of the channel 1 is adjusted by overlapping the channel 4 extension and the impulsion of the fluid accepted by terminal T1 is transmitted by the exit terminal T4 to the respective cylinder which effect the steering change in the inverse direction. At the same time, the fluid of the opposite cylinder returns to the pump through terminal T3 connection to the terminal T2, as seen in FIGS. 3, 6 and 9.

The safety valve is constituted by the connection of two pistons P1, P2 having different diameters, and by their respective cylinders situated in an axial and external position, to the second cylinder of the steering valve, as seen in FIGS. 19 and 20.

The cylinder of the smaller diameter piston P1 communicates by means of connections, of substantial section, in the transversal position T3 and T4 with the cylinders which performs the steering direction. The cylinder of the larger diameter P2 communicates with the entrance collector of the fluid in the steering valve and receives the fluid impulsion through the corresponding terminal T1. The respective pressure, acting on the larger piston P2, surpassing the resistance faced by the piston P1 and the spring S, impels the piston P1 in order to interrupt the free fluid circulation through the steering valve, as seen in FIG. 19. The terminal R allows the respiration of the piston cylinder P2, and is preferably connected to the fluid tank.

If there is a lack of the fluid emission (pump damage, cut of the shaft strap, engine stop) and the pressure on the piston of larger diameter P2 is annulled, the spring S expansion will return the piston 1 and the free fluid circulation will be re-established between the steering cylinders, allowing an easy steering control, manual only, without the hydrostatic support of the steering valve, as seen in FIGS. 1 and 20.

The progression valve is constituted by the cylinder and its piston PV centered and connected to the cylinder and the larger piston P2. The pistons are connected by means of a central shaft as seen in FIGS. 19 and 20.

The progressive vacuum effect admitted by the terminal TV acts on the piston PV in order to obtain a depression force, progressively increasing and superior to the resistance faced by the pressure on the larger piston P2, being performed the pistons P1 and P2 return in a progressive way; the return, allowing the direct fluid circulation between the steering cylinders in a progressive way, performs the progressive reduction of the steering hydrostatic control, as seen in FIG. 20.

By establishing an adequate relation between the diameters of the pistons P1, P2 and PV, the spring force, and the values of the fluid pressure and of the vacuum effect, it is obtained a progressive reduction of the steering hydrostatic control from a certain speed of a vehicle.

What is claimed is:

1. Control valves of a hydrostatic steering system, comprising an external body housing a steering valve, a safety valve and a progressive valve, in order to control a hydrostatic steering system, wherein:

the steering valve comprising a first cylinder and a second cylinder concentric with a steering shaft, the first cylinder rolling conjointly with said steering shaft by springs and its rotation in relation with the second cylinder limited by bolts, channels formed in contiguous peripheries of said first and second cylinders, said channels forming connected sets, each set having an independent fluid circulation, the safety valve comprising a third cylinder and a first and second piston and a spring and connected to the steering valve, the progression valve comprises a fourth cylinder and a third piston connected to the second piston of the safety valve and operating by a vacuum effect.

2. The control valves, according to claim 1, wherein the first cylinder rolls conjointly with the rotation of the steering shaft, by means of attrition produced by the pressure of said springs introduced in slots, said slots are formed in an axial and symmetrical way in the internal periphery of said first cylinder.

3. The control valves, according to claim 1, wherein the bolts, are symmetrically fixed in said second cylinder and extend into slots formed in said first cylinder; the radial section of said slots corresponds to the radial sections of the bolts and of the channels allowing said cylinder rotation in one direction or in the inverse direction so that the exact overlapping of the contiguous extremities of connection of said channels.

4. The control valves, according to claim 1, wherein said channels are formed in axial position in the contiguous peripheries of said first and second cylinders and have a small width; connected sets of channels are formed in which the connection extremities of each channel are extensive and contiguous, each set of said channels corresponds to a set of fluid circuits and their connections; the greater extension of said connections permits the increase in the fluid circulation and the decrease in the respective fluid pressure; permitting the safe control of the direction of the fluid circulation.

5. The control valves, according to claim 1, wherein each channels set has openings corresponding to external connection terminals; the openings are connected to fluid collectors formed in the external periphery of the second cylinder.

6. The control valves, according to claim 1, wherein the first and second pistons, are connected and have different diameters; the cylinder of the smaller diameter piston communicates by means of connections, with the first and second cylinders the cylinder of the bigger diameter piston receives the fluid impulsion through a corresponding terminal, wherein the pressure, acting on the second piston surpasses the resistance faced by the first piston and the spring impelling said first piston to interrupt the free fluid circulation between the first and second cylinders and permitting the control of the fluid circulation through the steering valve.

7. The control valves, according to claim 6, wherein when there is a lack of the fluid pressure on the second piston the spring causes the first piston return, said return re-establishes the free fluid circulation between the first and second cylinders allowing an easy steering control, without the support of the steering valve.

8. The control valves, according to claim 1, wherein the progression valve is connected to the third cylinder and the second piston, said third and fourth cylinders are connected by means of a central shaft; the vacuum effect admitted by a terminal acts on the third piston in order to obtain a depression force, progressively increasing and superior to the resistance faced by the pressure on the second piston the first and second pistons return in a progressive way; said return, produces a progressive reduction of the steering hydrostatic control.

9. The control valves, according to claim 8, wherein establishing an adequate relation between the first, second and third pistons diameters, the spring force, and the valves of the fluid pressure and of the depression of the vacuum effect, a progressive reduction of the steering hydrostatic control from a certain speed of a vehicle is obtained.

* * * * *